United States Patent Office 3,002,985
Patented Oct. 3, 1961

3,002,985
FERROUS CHELATES OF AMINO ACIDS
Sataro Imado, Sakai City, Japan, assignor to Tanabe Seiyaku Co., Ltd., Osaka, Japan, a corporation of Japan
No Drawing. Filed Dec. 16, 1959, Ser. No. 859,860
Claims priority, application Japan Dec. 22, 1958
13 Claims. (Cl. 260—439)

The present invention is directed to organic ferrous compounds, more particularly to assimilable compounds such as are used in the treatment of iron-deficiency anemias. Still more particularly it relates to ferrous chelates produced by a process described below.

It is recognized that iron preparations which are therapeutically valuable for the treatment of iron-deficiency anemias must contain the iron in the ferrous form. Such compounds as previously used consisted of organic or inorganic bivalent salts of iron, but they suffered from disadvantages. For instance, ferrous salts have many incompatibilities which necessitated that they be prescribed alone. Also, such compounds are quite unstable in the atmosphere and they are readily oxidized into ferric compounds, whereby the effectiveness thereof is substantially decreased.

The present invention is intended and adapted to overcome the deficiencies of prior iron preparations of the type described, it being among the objects of this invention to provide a therapeutically valuable preparation of bivalent iron which is stable on storage and which may be compatible with other pharmaceuticals on prescription.

In accordance with this invention, it has been found that by the reaction of an alkali metal or ammonium salt of a 2-amino-3-hydroxyalkanoic acid or a 2-amino-3-mercaptalkanoic acid such as serine, threonine, cysteine, homocysteine with a water-soluble ferrous salt such as the chloride, sulfate, nitrate and carbonate in the presence of an aldehyde such as acetaldehyde, propionaldehyde, butyraldehyde and vanillin, a ferrous chelate of the corresponding N-lower alkyliden or N-vanilliliden amino acid is formed.

In a preferred embodiment of this invention, 2 moles of the amino acid are dissolved in water and neutralized with a stoichiometric amount of an alkali such as aqueous ammonia, sodium hydroxide, sodium carbonate, sodium bicarbonate and potassium hydroxide to form an alkali metal or ammonium salt of the amino acid. To the solution, 1 mole of a water-soluble ferrous salt is added. After the reaction by which ferrous amino-alkanoate is formed has completed, at least 2 moles of an aldehyde are added to the solution. The reaction is carried out at a temperature of 50 to 60° C. Alternatively, the reaction of the amino-alkanoate with a water-soluble ferrous salt may be carried out in the presence of an aldehyde. When the reaction progresses and then the reaction product begins to crystallize, the mixture is cooled and allowed to stand. The product is separated from the mixture, for example by filtration, washed with water and then with an organic solvent such as methanol, ethanol, acetone or ether and dried with an air blast. The product thus obtained is substantially a pure ferrous chelate of N-alkyliden or N-vanilliliden derivative of the amino acid.

The process is applicable to L-2-amino-3-hydroxy (or mercapto) alkanoic acid, D-2-amino-3-hydroxy (or mercapto) alkanoic acid, and to racemic mixtures thereof. Among these stereoisomers, biologically active L-amino acid such as L-serine, L-threonine, L-cysteine or L-homocysteine is most useful.

The product covered by this invention has the following structural formula:

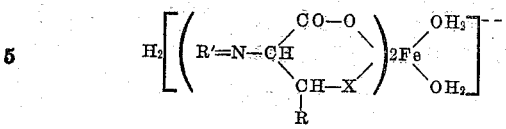

wherein R represents a hydrogen atom or an alkyl group, X represents an oxygen or sulfur atom and R' represents an alkyliden or vanilliliden group.

Example 1

3.6 g. of DL-threonine and 2.5 g. of sodium bicarbonate are dissolved in 20 cc. of water. A solution of 4.2 g. of ferrous sulfate heptahydrate in 20 cc. of water is added to the solution and the mixture is filtered. The filtrate is warmed to about 50° C. and 3 cc. of 53% aqueous solution of acetaldehyde is added under keeping the same temperature. When the reaction produce begins to crystallize, the mixture is cooled and allowed to stand. After the crystallization is substantially completed, the product is separated by filtration, washed with water several times, then with methanol and ether succesively and dried with an air blast.

5.7 g. of bis (N-ethyliden-DL-threoninato) iron (II) dihydrate which is of light tan color is obtained. The yield is about 99%.

*Analysis.*—Calculated for $C_{12}N_{24}O_8N_2Fe$: C, 37.91; H, 6.36; N, 7.37; Fe, 14.71. Found: C, 37.51; H, 6.09; N, 7.07; Fe, 14.59.

Example 2

3.6 g. of DL-threonine, 2.5 g. of sodium bicarbonate, 4.2 g. of ferrous sulfate heptahydrate, 3 cc. of 53% aqueous solution of acetaldehyde and 40 cc. of water are made to react by heating up to about 50% C. When the reaction product begins to crystallize, the mixture is cooled and allowed to stand. After the crystallization has been substantially completed, the product is separated by filtration, washed with water several times, then with methanol and ether successively and dried with an air blast. 5.7 g. of the same bis (N-ethyliden-DL-threoninato) iron (II) dihydrate as the product of Example 1 is produced.

Example 3

1.2 g. of DL-threonine, 0.8 g. of sodium bicarbonate and 1.4 g. of ferrous sulfate heptahydrate are dissolved in 40 cc. of water, and the solution is filtered. To the filtrate, 3 g. of butyraldehyde and 1.2 g. of DL-threonine are added and the mixture is made to react by heating up to about 50° C. The reaction progresses vigorously and the reaction product crystallizes while an excess to the stoichiometric amount of butyraldehyde is polymerized into resin.

After the reaction has been completed, the mixture is cooled and the resin is removed by extraction with ether. The product is separated by filtration, washed with water, acetone and ether successively and dried with an air blast.

2.2 g. of bis (N-butyliden-DL-threoninato) iron (II) dihydrate is obtained.

*Analysis.*—Calculated for $C_{16}H_{32}O_8N_2Fe$: C, 4.04; H, 7.34; N, 6.42. Found: C, 44.00; H, 7.32; N, 6.25.

Example 4

0.9 g. of L-cysteine hydrochloride monohydrate, 0.5 g. of ferrous chloride tetrahydrate, 0.8 g. of sodium bicarbonate are dissolved in 30 cc. of water. The solution has been filtered and 3 cc. of 56% aqueous solution of acetaldehyde is added to the filtrate. The mixture is made to react by heating up to about 50° C. After the reaction has been completed, the mixture is cooled and allowed to stand for crystallization. The product is separated by filtration, washed with water several times and dried with an air blast.

0.8 g. of bis (N-ethyliden-L-cysteinato) iron (II) dihydrate is obtained.

*Analysis.*—Calculated for $C_{10}H_{20}O_6N_2S_2Fe$: C, 31.25; H, 5.21; N, 7.29; S, 16.77; Fe, 14.56. Found: C, 31.31; H, 5.40; N, 7.00; S, 16.69; Fe, 14.52.

Example 5

1.2 g. of DL-threonine and 0.4 g. of sodium bicarbonate are dissolved in 25 cc. of 50% ethanol. The solution is incorporated with a solution of 1.4 g. of ferrous sulfate heptahydrate in 25 cc. of 50% ethanol and the mixture is filtered. A solution of 1.5 g. of vanillin in 10 cc. of ethanol is added to the filtrate and the mixture is made to react by heating up to about 50° C. for a while. After the reaction has been completed, the mixture is cooled and allowed to stand for crystallization. The product is separated by filtration, washed with water and ethanol successively and dried with an air blast. 1.6 g. of bis (N-vanilliliden-DL-threoninato) iron (II) dihydrate, which is of light tan color, is obtained.

*Analysis.*—Calculated for $C_{24}H_{32}O_{12}N_2Fe$: C, 48.32; H, 5.37; N, 4.70. Found: C, 48.00; H, 5.21; N, 4.60.

Example 6

0.5 g. of L-serine and 0.4 g. of sodium bicarbonate are dissolved in 25 cc. of water. A solution of 0.7 g. of ferrous sulfate heptahydrate in 25 cc. of water is added to the solution and the mixture is filtered. 50% aqueous solution of acetaldehyde is added to the filtrate and the 1 cc. of mixture is made to react by heating at about 50° C. for a while. After the reaction has been completed, the mixture is cooled and allowed to stand for crystallization. The product is separated by filtration, washed with water several times and dried with an air blast. 0.5 g. of bis (N-ethyliden-L-serinato) iron (II) dihydrate, which is of light tan color is obtained.

*Analysis.*—Calculated for $C_{10}H_{20}O_8N_2Fe$: C, 34.09; H, 5.68; N, 7.96; Fe, 15.91. Found: C, 34.26; H, 5.22; N, 7.66; Fe, 15.80.

Reaction of an alkali metal or ammonium salt of L-serine with water-soluble ferrous salts in the presence of the various aldehyde in the same manner as described in the preceding examples produces the following compounds:

(a) Bis (N-propyliden-L-serinato) iron (II) dihydrate

*Analysis.*—Calculated for $C_{12}H_{24}O_8N_2Fe$: C, 37.89; H, 6.32; N, 7.37. Found: C, 37.30; H, 6.00; N, 7.21.

(b) Bis (N-butyliden-L-serinato) iron (II) dihydrate

*Analysis.*—Calculated for $C_{14}H_{28}N_2Fe$: C, 41.18; H, 6.86; N, 6.86. Found: C, 40.95; H, 6.63; N, 6.90.

(c) Bis (N-vanilliliden-L-serinato) iron (II) dihydrate

*Analysis.*—Calculated for $C_{22}H_{28}O_{12}N_2Fe$: C, 46.68; H, 4.93; N, 4.93. Found: C, 46.10; H, 4.85; N, 4.90.

Example 7

0.9 g. of L-cysteine hydrochloride and 0.8 g. of sodium bicarbonate are dissolved in 25 cc. of 50% ethanol. The solution is incorporated with a solution of 0.5 g. of ferrous chloride tetrahydrate in 25 cc. of 50% ethanol and the mixture is filtered. A solution of 0.8 g. of vanillin in 10 cc. of ethanol is added to the filtrate and the mixture is made to react by heating up to about 50° C. for a while. After the reaction has been completed, the mixture is cooled and allowed to stand for crystallization. The product is separated by filtration, washed with water and ethanol successively and dried with an air blast. 1.6 g. of bis (N-vanilliliden-L-cysteinato) iron (II) dihydrate, which is of light tan color, was obtained.

*Analysis.*—Calculated for $C_{24}H_{32}O_{10}N_2S_2Fe$: C, 45.86; H, 4.46; N, 5.00; S, 10.19. Found: C, 45.39; H, 5.00; N, 4.41; S, 10.11.

What is claimed is:

1. A method of preparing a ferrous chelate of an amino acid taken from the class consisting of 2-amino-3-hydroxyalkanoic acid and 2-amino-3-mercaptalkanoic acid there being not more than 6 carbon atoms in the chain of said alkanoic acid which comprises forming the alkali metal salt of said acid, mixing said salt with a water soluble ferrous salt in aqueous solution, then adding a hydrocarbon aldehyde having up to 8 carbon atoms, whereby a reaction takes place forming said ferrous chelate.

2. A method according to claim 1 in which the molar ratio of acid to ferrous salt is about 2 to 1.

3. A method according to claim 1 in which the reaction is conducted at about 50° to 60° C.

4. A method according to claim 1 in which the reaction is conducted in the presence of an aldehyde taken from the class consisting of an alkanal and vanillin.

5. A method according to claim 1 in which the alkyl group of said acid has 2 to 6 carbon atoms.

6. A method according to claim 1 in which said acid is taken from the class consisting of serine, threonine, cysteine and homocysteine.

7. A method according to claim 2 in which said aldehyde is in the ratio of about 2 to 1 of said salt.

8. A ferrous chelate selected from the class consisting of bis (2-alkylidenamino-3-hydroxyalkanoato) iron (II), bis (2-alkylidenamino-3-mercaptalkanoato) iron (II), bis (2-vanillilidenamino-3-hydroxyalkanoato) iron (II), bis (2-vanillilidenamino-3-mercaptalkanoato) iron (11), and hydrates thereof, the alkyliden group having up to 8 carbon atoms and there being not more than 6 carbon atoms in the chain of each of said alkanoato compounds.

9. Bis (N-lower alkylidenthreoninato) iron (II).

10. Bis (N-lower alkylidenserinato) iron (II).

11. Bis (N-lower alkylidencysteinato) iron (II).

12. Bis (N-vanillilidenthreoninato) iron (II).

13. A method of preparing a ferrous chelate of threonine which comprises forming the alkali metal salt of threonine, mixing said salt with a water soluble ferrous salt in aqueous solution, then adding a lower alkanal whereby a reaction takes place, forming said chelate.

No references cited.